United States Patent Office 3,577,433
Patented May 4, 1971

3,577,433
KETO-ENOL NITROGEN-CONTAINING HETEROCYCLES HAVING AN AMINO SUBSTITUENT
Robert Fuks, Ixelles, Brussels, and Heinz G. Viehe, Beersel, Linkebeek, Belgium, assignors to Union Carbide Corporation
No Drawing. Filed Aug. 8, 1967, Ser. No. 659,013
Int. Cl. C07d 27/16
U.S. Cl. 260—326.5
9 Claims

ABSTRACT OF THE DISCLOSURE

There is disclosed a new class of nitrogen-containing heterocyclic compounds. The new compounds have a nitrogen hetero atom in a five- or six-membered ring (the ring can be fused to one or more other rings), an amino substituent on the ring carbon alpha to the hetero nitrogen, and an oxygen (either carbonyl or hydroxyl) bonded to the ring carbon gamma to the hetero nitrogen. The new compounds are exemplified by 3-hydroxy-5-amino-pyrrolenines and 4-hydroxy-2-amino-quinolines (or the ketone tautomers thereof). The new compounds are produced by reacting an alpha- or a beta-aminoester with an N,N-disubstituted-1-amino-1-alkyne or an N,N,N',N'-tetrasubstituted-1,1-diamino-1-alkene. This process for producing the new compounds is also novel. The compounds are useful as hydrogen halide acceptors and catalysts.

The invention relates to novel nitrogen-containing heterocyclic compounds and to a process for producing them. The new compounds are nitrogen-containing heterocycles having (a) a hetero nitrogen atom in a five- or six-membered ring, which can be fused to one or more rings, (b) an amino substituent on the ring carbon alpha to the hetero nitrogen, and (c) an oxygen (either carbonyl or hydroxyl) bonded to the ring carbon gamma to the hetero nitrogen. The process for producing these new compounds comprises reacting an N,N-disubstituted-1-amino-1-alkyne or an N,N,N',N'-tetrasubstituted-1,1-diamino-1-alkene either with an alpha-aminoester (to form a five-membered heterocyclic ring) or with a beta-aminoester (to form a six-membered heterocyclic ring).

In the discussion below, the N,N-disubstituted-1-amino-1-alkynes will usually be referred to as "ynamines"[1] and the N,N,N',N'-tetrasubstituted-1,1-diamino-1-alkenes will usually be referred to as "ketene-N,N-acetals."

The process of the invention can best be understood by referring to the chemical reactions that take place therein. For instance, when an ynamine is reacted with an alpha-aminoester, the following reaction occurs:

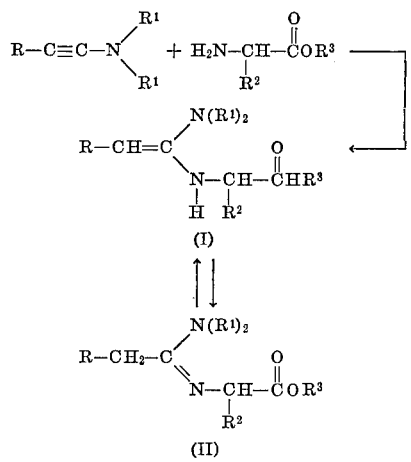

[1] H. G. Viehe, Angew. Chem. 75, 638 (1963); Angew. Chem. internat. Edit. 2, 477 (1963).

Compound (I) is in equilibrium with (II). Compound (I) then can undergo a ring-closing reaction by splitting off alcohol $R^3OH$:

(I) $\xrightarrow{-R^3OH}$

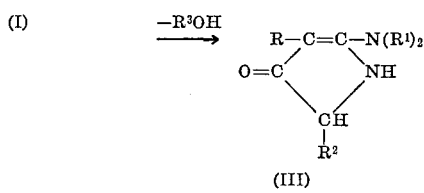

(III)

The product (III) then probably tautomerizes, at least in part, to the 3-hydroxy-5-amino-pyrrolenine:

(III) $\longrightarrow$

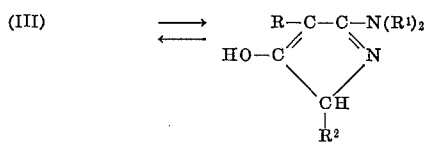

When a beta-aminoester is used in the foregoing sequence of reactions instead of the alpha-aminoester, a 4-hydroxy-2-amino-dihydro-pyridine is formed:

$R-C \equiv C - N(R^1)_2 + H_2N - CH - CH - \overset{O}{\overset{\|}{C}} OR^3$
$\phantom{R-C \equiv C - N(R^1)_2 + H_2N - }R^2\phantom{H-}R^2$ $\downarrow -R^3OH$

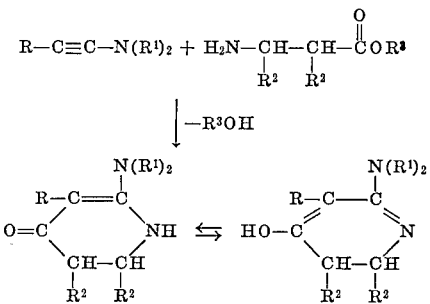

If a ketene N,N-acetal is used in place of the ynamine, the sequence of reactions with an alpha-aminoester is the following

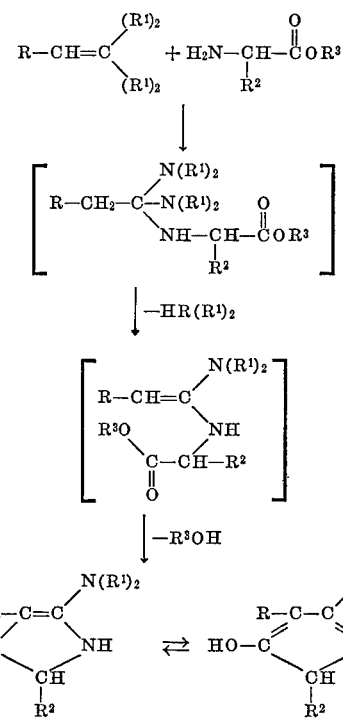

Similarly, when a ketene-N,N-acetal is reacted with a beta-aminoester, a 4-hydroxy - 2 - aminoquinoline is produced.

In an additional variation of the process, a secondary aminoester can be used, for example:

$$R-C\equiv C-N(R^1)_2 + HNR^4-\underset{R^2}{CH}-\overset{O}{\overset{\|}{C}}OR^3$$

$$\downarrow -R^3OH$$

$$\begin{matrix} R-C=C & \diagup N(R^1)_2 \\ \| & \\ O=C & N-R^4 \\ & \diagdown \underset{R^2}{CH} \diagup \end{matrix}$$

In this case, tautomerization to the enol form is not possible, and the product exists solely in the ketone form.

The ynamine reactant that is used in the invention can be prepared by known procedures. For instance, one method is to react a 1-halogenalkyne with an alkali metal amide:

$$R-C\equiv C-X + MN(R^1)_2 \longrightarrow R-C\equiv C-N(R^1)_2 + Mx$$

(X is halogen such as chlorine and M is alkali metal such as sodium or lithium.) This method is described in the literature, for instance, by Viehe et al., Angew. Chem. 76, 537 (1964); Angew. Chem. International Edit. 3, 506 (1964).

Other useful methods for producing ynamines include:
(1) reaction of alkali metal amide with dihaloalkene or trihaloalkene, for instance:

$$R-CCl=CHF \xrightarrow{LiN(CH_3)_2} R-C\equiv C-N(CH_3)_2$$

$$FCH=CCl_2 \xrightarrow{LiN(C_2H_5)_2} (C_2H_5)_2NC\equiv CN(C_2H_5)_2$$

[Viehe et al., op. cit., and H. G. Viehe, Angew. Chem. 75, 638 (1963); Angew. Chem. Internat. Edit. 2, 477 (1963).]

(2) reactions of ynethers with lithium amides, for instance:

$$C_2H_5-C\equiv C-OC_2H_5 \xrightarrow{LiN(C_3H_7)_2} C_2H_5-C\equiv C-N(C_2H_7)_2$$

[Montijn et al., Recueil Trav. Chim. Pays-Bas 83, 1211 (1964).]

(3) reaction of halogenacetylenes and aliphatic tertiary amines, for instance:

$$t-C_4H_9-C\equiv C-Cl \xrightarrow{N(CH_3)_3} t-C_4H_9-C\equiv C-N(CH_3)_2$$

(Viehe et al., op. cited)

(4) reaction of ynamine lithium derivative with an alkylating agent, for instance:

$$C_6H_5(CH_3)N-C\equiv C-Li \xrightarrow{CH_3I} CH_3-C\equiv C-N(CH_3)C_6H_5$$

(Ficini et al., Bull. Soc. Chim. France 1965, 2787.)

(5) elimination of halogen from an alpha-, beta-dihaloenamine, for instance:

$$C_6H_5CCl=CCl-N(C_2H_5)_2 \xrightarrow{C_4H_9Li} C_6H_5-C\equiv C-N(C_2H_5)_2$$

(Ficini et al., op. cited)

(6) reaction of alpha-halegeno iminium salts with lithium amide:

$$R-CH_2-CCl=\overset{(+)}{N}(R^1)_2]Cl^{(-)} \xrightarrow{LiN(R^1)_2}$$

$$R-C\equiv C-N(R^1)_2 + R-CH=C \diagup \underset{N(R^1)_2}{N(R^1)_2}$$

[Buijle et al., Angew, Chem. 78, 593 (1966); Angew Chem. Internat. Edit. 5 (1966).]

(7) propargylamine isomerization:

$$HC\equiv C-CH_2N(R^1)_2 \rightarrow CH_3-C\equiv C-N(R^1)_2$$

[Dumont, C. R. Accad. Sc. Paris 261, 1710 (1965); Zaugg et al., J. Org. Chem. 23, 1389 (1958).]

The ynamines that are useful in the process of the invention are compounds that can be represented by Formula I:

$$I \qquad R-C\equiv C N\diagup \underset{R^1}{\overset{R^1}{\diagdown}}$$

wherein each $R^1$ individually represents a hydrocarbon group such as alkyl, cycloalkyl, aryl, arylalkyl, alkaryl, the two $R^1$ groups taken together with the nitrogen atom to which they are bonded to form a 5- or 6-membered, nitrogen-containing heterocyclic ring, and the like. Also, the said hydrocarbon group can contain substituents that are free of reactive hydrogen (i.e., free of primary or secondary amino groups, hydroxyl groups, aldehyde groups, mercapto groups, and the like) that are free of groups that can react with the aminoester (such as isocyanato groups, vicinal epoxide groups, and the like), and that are free of groups that can react with the triple bond of the ynamine under the conditions of the process of the invention. Such reactive groups include, in addition to active hydrogen-containing groups, polar multiple bonds such as >C=O groups, >C=S groups, >C=N— groups, and the like (cf., see copending application "Cyclo-Addition Reactions of Aminoacetylenes," by H. G. Viehe, U.S. application Ser. No. 376,253, filed June 18, 1964, now U.S. Pat. 3,340,246). Among the substituent groups that can be in the $R^1$ variables are oxy —O—, thio —S—, tertiary amino, carbonyl (provided that the carbonyl is not activated by proximity to an electron-donating group), and the like. Normally, the $R^1$ variable will not contain more than 20 carbon atoms, and preferably not more than 12 carbon atoms. The variable R can be either a hydrocarbon group as defined for $R^1$, or an $$-N\diagup \underset{R^1}{\overset{R^1}{\diagdown}}$$

group.

Specific illustrative ynamines include the 1-aryl-2-(N, N-dialkylamino)acetylenes such as 1-phenyl-2-(N,N-dimethylamino)acetylene,
1-phenyl-2-(N,N-diethylamino)acetylene,
1-phenyl-2-(N,N-dipropylamino)acetylene,
1-phenyl-2-(N-methyl-N-ethylamino)acetylene,
1-phenyl-2-(N,N-dibutylamino)acetylene,
1-phenyl-2-(N,N-diisobutylamino)acetylene,
1-phenyl-2-(N,N-dipentylamino)acetylene,
1-phenyl-2-(N,N-di-t-butylamino)acetylene,
1-phenyl-2-(N,N-dihexylamino)acetylene,
1-phenyl-2-(N-methyl-N-octylamino)acetylene,
1-phenyl-2-(N-methyl-N-laurylamino)acetylene,
1-phenyl-2-(N-methyl-N-stearylamino)acetylene,
1-(p-methoxyphenyl)-2-(N,N-dimethylamino)acetylene,
1-(p-N,N-dimethylaminophenyl)-2-(N,N-dimethylamino)acetylene, and the like.

Other useful ynamines include the 1-alkyl-2-(N,N-dialkylamino)acetylenes such as 1-methyl-2-(N,N-dimethylamino)acetylene,
1-ethyl-2-(N,N-dimethylamino)acetylene,
1-isopropy-2-(N,N-dimethylamino)acetylene,
1-t-butyl-2-(N,N-diethylamino)acetylene,
1-(1-thia-3-methylpropyl)-2-(N,N-diethylamino) acetylene,
1-(1-thiapentyl)-2-(N,N-diethylamino)acetylene,
1-(1-thiapropyl)-2-(N,N-dimethyamino)acetylene,
1-t-butyl-2-(N,N-dimethylamino)acetylene,
1-propyl-2-(N,N-diethylamino)acetylene,
1-hexyl-2-(N,N-diethylamino)acetylene,
1-methyl-2(N,N-dipentylamino)acetylene, and the like.

Additional useful ynamines include the 1-aryl- or 1-alkyl-2-(N-aryl-N-alkylamino)acetylenes such as 1-methyl-2-(N-phenyl-N-methylamino)acetylene,
1-phenyl-2-(N-phenyl-N-methylamino)acetylene,
1-t-(butyl-2-(N-phenyl-N-methylamino)acetylene,
1-phenyl-2-(N-phenyl-N-methylamino)acetylene,
1-propyl-2-(N-phenyl-N-methylamino)acetylene,
1-ethyl-2-(N-phenyl-N-methylamino)acetylene,
1-(1-methylpropyl)-2-(N-phenyl-N-methylamino)acetylene,
1-octyl-2-(N-phenyl-N-methylamino)acetylene,
1-stearyl-2-(N-phenyl-N-methylamino)acetylene,
1-methyl-2-(N-phenyl-N-ethylamino)acetylene, and the like.

Still more useful ynamines include those wherein the amino group is part of a heterocyclic ring such as N-(2-phenylethynyl)morpholine,
N-(prop-1-ynyl)morpholine,
N-(prop-1-ynyl)pyrrolidine,
N(2-phenylethynyl)pyrrolidine,
N-(prop-1-ynyl)piperidine,
N-(2-phenylethynyl)piperidine, and the like.

Further useful ynamines include 1-cyclohexyl-2-(N,N-dimethylamino)acetylene,
1-phenyl-2-(N-cyclopentyl-N-methylamino)acetylene,
1-(2-methoxyethyl)-2-(N,N-dimethylamino)acetylene,
1-(3-chloropropyl)-2-(N,N - diethylamino)acetylene, and the like.

The preferred ynamines are the 1-phenyl-2-(N,N-dialkylamino)acetylenes wherein the alkyl groups have up to 6 carbon atoms, the 1-alkyl-2-(N,N-dialkylamino)acetylenes wherein the alkyl groups have up to 6 carbon atoms, and the ynamines wherein the amino group is part of a heterocyclic ring such as the morpholines, pyrrolidines, and piperidines mentioned above.

In lieu of an ynamine, the process of the invention can use a ketene-N,N-acetal as a reactant. Ketene-N,N-acetals can be prepared by method (6), above, which produces both ynamines and ketene-N,N-acetals. A better method for preparing ketene-N,N-acetals is to react a secondary amine with an ynamine:

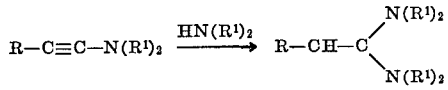

Thus, the ketene-N,N-acetals that can be used in the process of the invention are those that are represented by Formula II:

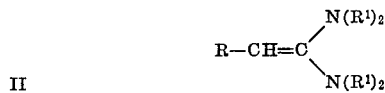

wherein R and $R^1$ have the meaning stated above with respect to Formula I.

Among the ketene-N,N-acetals that can be used are the reaction products of any of the ynamines specifically mentioned above and a secondary amine such as dimethylamine, diethylamine, diisopropylamine, morpholine, piperidene, pyrrolidine, and the like. Since an $HN(R^1)_2$ molecule is given off during the process of the invention when a ketene-N,N-acetal is used, at least one of the $-N(R^1)_2$ moieties should form a relatively volatile secondary amine $HN(R^1)_2$.

Specific illustrative ketene-N,N-acetals that can be used in the invention include 1-methyl-2-bis(N,N-dimethylamino)ethylene,
1-phenyl-2-bis(N,N-dimethylamino)ethylene,
1-cyclohexyl-2-(N,N-dimethylamino)-2-(N,N-diethylamino)ethylene,
1-methyl-2-(N,N-diethylamino)-2-(N-methyl-N-phenylamino)ethylene,
1-ethyl-2-bis(N,N-diethylamino)ethylene,
1-butyl-2-bis(N,N-diethylamino)ethylene,
N-(1-N,N-dimethylaminoprop-1-ene)piperidine,
N-(1-N,N-diethylaminoprop-1-ene)piperidine,
N-(1-N,N-dipropylaminoprop-1-ene)piperidine,
N-(1-N,N-dimethylaminoprop-1-ene)pyrrolidine,
N-(1-N,N-dimethylaminoprop-1-ene)morpholine, and the like.

It is preferred in most cases to carry out the process of the invention with an ynamine rather than a ketene-N,N-acetal. The reason for this preference is principally economic since the ketene-N,N-acetal is usually derived from the ynamine. The ketene-N,N-acetal will mostly be used in those cases where it is desired to have an $-N(R^1)_2$ moiety in the final product that is difficult to obtain in good yield as the amino portion of an ynamine. In such cases, such an $-N(R^1)_2$ moiety can be added (as a secondary amine) to an ynamine that contains, for example, a dimethylamino group that forms a very volatile secondary amine.

An aminoester is also employed in the process of the invention. The alpha-aminoesters that can be used are exemplified by those that are represented by Formula III:

wherein $R^3$ represents the residue after removal of the hydroxyl group of a relatively volatile alcohol such as methanol, ethanol, isopropyl alcohol, butanol, and the like, and wherein $R^2$ and $R^4$ individually can be hydrogen, alkyl, aryl, cycloalkyl, aralkyl, alkaryl, and the like. Also, the $R^2$ and $R^4$ variables can be bonded together to form a nitrogen-containing heterocyclic ring. The $R^2$ and $R^4$ variables can also be substituted with groups that do not interfere with the process of the invention. Such groups include oxy, thio, tertiary amino, carbonyl, and the like. In most cases, the $R^2$ and $R^4$ variables will contain not more than 20 carbon atoms, and preferably not more than 12 carbon atoms.

Specific illustrative alpha - aminoesters include the methyl, ethyl, n-propyl, isopropyl, butyl, pentyl and hexyl esters of the following acids:

Glycine, alanine, 2-aminobutyric acid, valine, norvaline, methionine, leucine, isoleucine, phenylalanine, p-methoxyphenylalanine, 3,4-di(methoxy)phenylalanine, 3,5-diiodo-4-methoxyphenylalanine, proline, 2-aminopentanoic acid, monoethyl ester of aspartic acid, monobenzyl ester of glutamic acid, 2-methylaminoacetic acid, piperidine-2-carboxylic acid, pyrrole-2-carboxylic acid, indole-2-carboxylic acid, and the like.

The preferred alpha-aminoesters are the methyl and ethyl esters of the naturally occurring alpha-aminoacids, and the methyl and ethyl esters of nitrogen-containing heterocyclic compounds such as piperidine-, pyrrole-, and indole-2-carboxylic acids.

Beta-aminoesters can also be employed as the aminoester reactant in the process of the invention. Among the beta-aminoesters that can be employed are the esters of 3-aminoalkanoic acids and derivatives thereof including the methyl, ethyl, isopropyl, butyl, pentyl and hexyl esters of 3-aminopropionic acid, 3-aminobutyric acid, 3-aminopentanoic acid, 3-aminohexanoic acid, 3-aminooctanoic acid, 3-aminolauric acid, 3-aminostearic acid, and the like. Other beta-aminoesters that are useful include cyclic compounds having an amino group and a carboxylate group bonded to adjacent ring carbons, such as the methyl, ethyl, propyl, butyl, pentyl and hexyl esters of anthranilic acid, 2-aminocyclohexanecarboxylic acid, 4-methoxy-2-aminobenzoic acid, and the like. Another useful group of beta-aminoesters are the esters of nitrogen-containing heterocyclic compounds having a carboxylic acid group bonded to the ring carbon atom beta to a heterocyclic $>$NH group. Specific illustrative examples include methyl, ethyl, propyl, butyl, pentyl, and hexyl esters of pyrrole-3-carboxylic acid, pyrrolidine-2-carboxylic acid, pyrroline- 3-carboxylic acid, piperidine-3-carboxylic acid, and the like. The preferred beta-aminoesters are the methyl and ethyl esters of the specific primary beta-aminoacids enumerated above.

The process of the invention comprises reacting an ynamine or a ketene-N,N-acetal with an alpha- or a beta-aminoester to form a keteneaminal, which then cyclizes to the heterocyclic compounds of the invention. (A keteneaminal is a compound containing the

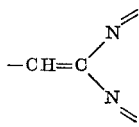

group, for instance, Compound (I) in the series of illustrative reactions set forth above.)

The addition reaction of a primary or a secondary amine to an ynamine to form a kenteneaminal (which will be in equilibrium with an amidine when a primary amine is used, e.g.,

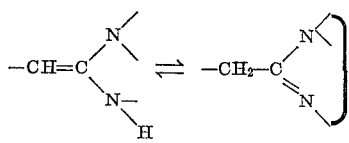

is a known reaction. This reaction is described, for example, by Wolf et al., Liebigs Ann. Chem. 638, 33 (1960); Viehe et al., Angew. Chem. 76, 571 (1964) and Angew. Chem. Internat. Edit. 3, 582 (1964); Ficini et al., Tetrahedron Letters; and copending United States Patent Applications of H. G. Viehe, Ser. No. 414,852 filed Nov. 30, 1964 now U.S. Patent 3,437,663 and Ser. No. 464,231 filed June 15, 1965, now U.S. Patent No. 3,505,403.

The addition reaction of a primary or a secondary amine with a ketene-N,N-acetal proceeds under essentially the same conditions as the addition reaction with the ynamine. The most significant difference is that when a ketene-N,N-acetal is used, conventional means should be employed to remove the byproduct volatile secondary amine from the reaction mixture as it is formed.

The addition reaction can be carried out with or without a solvent. However, an inert organic solvent is preferred. Suitable inert solvents include hydrocarbons, halogenated hydrocarbons, and hydrocarbon ethers, for example, hydrocarbons such as petroleum ether, cyclohexane, 2-ethylhexane, benzene, toluene, xylene and the like, and ethers such as diethyl ether, di-isopropyl ether, methylbutyl ether, dioxane, tetrahydrofuran, ethylene glycol dimethyl ether, diethylene glycol dimethyl ether, and the like, and inert halogenated hydrocarbons such as methylene chloride, chlorobenzene, bromobenzene, and the like. When a ketene-N,N-acetal is a reactant, it is preferred that the solvent have a boiling point higher than the byproduct volatile secondary amine in order to facilitate removal of the secondary amine by distillation.

The temperatures at which the addition reaction is carried out can vary widely depending upon the particular reactants, and the proper choice of temperature is illustrated by the examples hereinbelow. Usually temperatures from about 0° C. up to about 100° C., and preferably from room temperature up to about 50° C., are satisfactory. When a solvent is employed, the boiling point of the solvent is often a convenient elevated temperature.

It is desirable in some cases, such as when a secondary amine is a reactant, to employ catalytic amounts of an acid such as boron trifluoride etherate in order to accelerate the addition reaction.

There is no particular advantage to be gained in carrying out the addition reaction at pressures other than atmospheric pressure. However, if a sealed reaction vessel is employed, the autogeneous pressure of the reaction mixture at the reaction temperature is satisfactory.

Since ynamines react readily with water, it is preferable to carry out the addition reaction under anhydrous conditions. This may be conveniently done by carrying out the process under an atmosphere of inert gas such as nitrogen, helium, argon, and the like.

The addition reaction takes place in good yield in reaction times of from a few minutes up to several days depending on the particular temperature, solvent, presence or absence of catalyst, the particular reactants, and the like.

The proportion of the reactants is not narrowly critical. Usually, approximately stoichiometric proportions or a small excess of ynamine or ketene-N,N-acetal is used. For instance, up to about a 10 percent stoichiometric excess of ynamine or ketene-N,N-acetal has been found to be satisfactory in many cases. The aminoester can be generated in situ from its hydrochloride salt, if desired. Conventional means, such as the addition of a slight excess of triethylamine, can be employed for this purpose as is illustrated by the example below.

The keteneaminal product of the addition reaction between the ynamine or ketene-N,N-acetal and the aminoester is then cyclized to produce the heterocyclic compositions of the invention. The cyclization can be effected by heating the ketene-aminal to an elevated temperature of, for example, from about 30° C. to about 200° C., or higher. One convenient way to carry out the cyclization reaction is to reflux the keteneaminal in a solvent of suitable boiling point. Such solvents include benzene, toluene, xylene, ethylene glycol, nitrobenzene, diethyl ether, and the like. In some cases, the cyclization will be effected simply by distilling the solvent used in the addition reaction. The exact temperature to use in the cyclization depends to an extent on the nature of the keteneaminal.

The time for the cyclization can take from a few minutes (e.g., 5 minutes) up to 10 hours or more, with times of from 1 to 5 hours being more usual.

The products are recovered by standard methods such as by distillation, recrystallization, and the like. The examples below illustrate some methods for recovering the product.

The novel heterocyclic compounds provided by the invention have a nitrogen hetero atom in a five- or six-membered ring, which can be fused to one or more other rings, an amino substituent on the ring carbon alpha to the hetero nitrogen, and an oxygen (either in a hydroxyl group or an oxo group) bonded to the ring carbon gamma to the hetero nitrogen. Among the heterocyclic compounds that are provided by the invention are the compounds that are represented by Formula IV:

IV
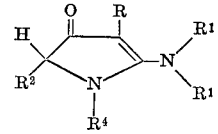

wherein the variables R, $R^1$, $R^2$, and $R^4$ are as defined above with respect to Formulas I, II, and III. When the variable $R^4$ is hydrogen, the enol tautomer appears to predominate, and the compound will then have the formula:

V
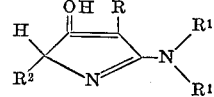

wherein R, $R^1$, and $R^2$ are as defined above with the obvious exception that $R^2$ cannot form a heterocyclic ring with $R^4$.

Specific illustrative examples of heterocyclic compounds falling within Formula IV and Formula V include the pyrrolines and the 2H-pyrroles such as:

3-hydroxy-4-phenyl-5-(N,N-dimethylamino)-2H-pyrrole,
2,3-dihydro-3-oxo-4-phenyl-5-(N,N-dimethylamino)-1-methylpyrrole, 2-methyl-3-hydroxy-4-phenyl-5-(N,N-dimethylamino)-
2H-pyrrole,
2-propyl-3-hydroxy-4-phenyl-5-(N,N-dimethylamino)-
2H-pyrrole,
2-isobutyl-3-hydroxy-4-phenyl-5-(N,N-dimethylamino)-
2H-pyrrole,
2-benzyl-3-hydroxy-4-phenyl-5-(N,N-dimethylamino)-2H-
pyrrole,
2-(2-ethoxycarbonylethyl)-3-hydroxy-4-phenyl-5-(N,N-
dimethylamino)-2H-pyrrole,
2-(2-benzyloxycarbonylethyl)-3-hydroxy-4-phenyl-5-
(N,N-dimethylamino)-2H-pyrrole,
3-hydroxy-4-methyl-5-(N,N-dimethylamino)-2H-pyrrole,
2-phenyl-3-hydroxy-4-ethyl-5-(N,N-diethylamino)-2H-
pyrrole,
2,3-dihydro-2-methyl-3-oxo-4-methyl-5-(N,N-
dimethylamino)-1-methylpyrrole, and the like.

Additional specific illustrative compounds falling within Formula IV include the 1-amino-3-oxo-3,4,5,6,7,8-hexahydropirrocolines that are represented by Formula VI;

VI
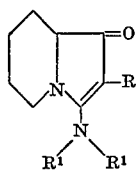

wherein R and R¹ are as defined above. Such compounds include:

1-(N,N-dimethylamino)-2-phenyl-3-oxo-3,4,5,6,7,8-
hexahydropirrocoline,
1-(N,N-dimethylamino)-2-methyl-3-oxo-3,4,5,6,7,8-
hexahydropirrocoline,
1-(N-methyl-N-phenylamino)-2-ethyl-3-oxo-3,4,5,6,7,8-
hexahydropirrocoline,
1-(N,N-dimethylamino)-2-isopropyl-3-oxo-3,4,5,6,7,8-
hexahydropirrocoline,
1-(N-morpholinyl)-2-methyl-3-oxo-3,4,5,6,7,8-
hexahydropirrocoline, and the like.

Other compounds within Formula IV invlude 2-(N,N-dimethylamino) - 3 - phenyl-4-oxo-1-azabicyclo[0.3.3]octane, 2 - (N,N-dimethylamino)-3-methyl-4-oxo-1-azabicyclo[0.3.3]octane, and the like.

The above-exemplified compounds that are within the scope of Formulas IV and V are produced by the process of the invention when an alpha-aminoester is reacted with an ynamine or a ketene-N,N-acetal. It is noted that these compounds have a heterocyclic nitrogen atom in a five-membered ring. When a beta-aminoester is used in the process of the invention, the resulting product contains a heterocyclic nitrogen in a six-membered ring. Such compounds include the 2-amino-3-R-4-oxo-1,4-dihydroquinolines, i.e., 2-amino-3-R-4-quinolones, of the formula:

VI
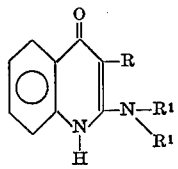

(wherein R and R¹ are as described above). Specific illustrative 4-quinolones include 2-(N,N-dimethylamino)-3-phenyl-4-quinolone, 2-(N,N-dimethylamino)-3-methyl-4-quinolone,
2-(N-methyl-N-phenylamino)-3-(3-methoxypropyl)-4-
quinolone,
2-(N,N-dimethylamino)-3-benzyl-4-quinolone, and the like.

The products derived by the inventive process from the primary beta amino-alkanoic esters and their derivatives are 2 - amino-3-R-4-hydroxy-5,6-dihydropyridines or the keto tautomers thereof (i.e., the 2-amino-3-R-4-oxo-1,4,5, 6-tetrahydropyridines) such as 2-(N,N-dimethylamino)-3-phenyl-4-hydroxy-5,6-dihydro-
pyridine,
2-(N,N-dimethylamino)-3-methyl-4-hydroxy-6-methyl-
5,6-dihydropyridine,
2-(N-methyl-N-phenyl) - 3 - methyl-4-hydroxy-6-benzyl-
5,6-dihydropyridine, and the like.

The products derived from esters of nitrogen-containing heterocyclic compounds having a carboxylic acid group bonded to the ring carbon beta to a heterocyclic —NH group include 2-(N,N-dimethylamino)-3-phenyl-4-oxo-1-azabicyclo
[3.3.1]nonane,
2-(N,N-dimethylamino)-3-methyl-4-oxo-1-azabicyclo
[3.3.1]nonane,
2-(N,N-dimethylamino) - 3 - methyl-4-oxo-1-azabicyclo
[3.2.1]octane, and the like.

The novel compounds of the invention are widely useful. For instance, they can be used as intermediates in the synthesis of new compounds and are therefore useful to research chemists. Because the compounds of this invention contain tertiary amino groups which are basic in nature, they can be used as hydrogen halide acceptors in the process for producing cyclopentadienyl metal compounds described in U.S. Pat. 3,071,605 which issued Jan. 1, 1963. Since tertiary amines are known catalysts for the reactions of isocyanates and epoxides with active hydrogen containing compounds, the compounds of this invention can be used as catalysts in the production of urethane polymers and polyepoxide resins of well-known utility.

The examples below illustrate the invention.

EXAMPLES 1-6

2-R²-3-hydroxy-4-pheny-5-(N,N-dimethylamino)-
2H-pyrroles

In these examples, 1-phenyl-2-(N,N-dimethylamino)-acetylene was reacted with the methyl or ethyl ester of a primary alpha-aminoacid in accordance with the overall reaction:

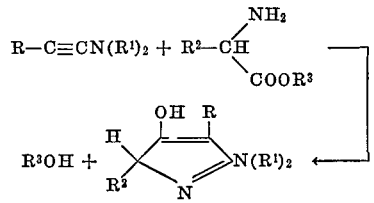

wherein R is phenyl, R¹ is methyl, R² is as indicated, and R³ is methyl or (in Example 5) ethyl. The general method for the preparation of these 2H-pyrroles was as follows:

The hydrochloride of the alpha-aminoester (0.01 mole) is suspended in 6 milliliters of diethyl ether, then 0.013 mole of triethylamine is added to free the amino group and the mixture is agitated for 30 minutes. Then a solution of 0.011 mole of ynamine in 6 milliliters of diethyl ether is added to the mixture and allowed to react at room temperature until the ynamine disappears (followed by the IR band of C≡C at 4.55 microns). This usually takes about 30 minutes. The solid triethylamine hydrochloride is searated from the solution which is then concentrated by distilling the solvent. The oily residue is the crude amidine intermediate which is dissolved in 10 milliliters of toluene and refluxed for from 1 to 5 hours (see the table below). By cooling, the pure end-product 2H-pyrrole crystallized. The product was purified by recrystallization from a mixture of methanol, acetone, and diethyl ether.

Table I, below displays the R² variable of the amino ester, the reflux times in toluene, melting points of the products, and the percent yields of the 2H-pyrrole products.

TABLE I

| R² | Reflux time, hrs. | Yield, percent | M.P., °C. |
|---|---|---|---|
| Example: | | | |
| 1 ........ H ........ | 1 | 82 | 214 |
| 2 ........ CH₃ ........ | 3 | 66 | 174 |
| 3 ........ Isobutyl ........ | 2 | 77 | 186 |
| 4 ........ Benzyl ........ | 3 | 64 | 168 |
| 5 ........ C₂H₅OOC(CH₂)₂ ........ | 5 | 66 | 137 |
| 6 ........ C₆H₅CH₂OOC(CH₂)₂ ........ | 2 | 40 | 115 |

The elementary analyses of these compounds were as shown in Table II below. The IR, UV, and NMR spectra were consistent with the assigned structure (i.e., the enol tautomer shown in the reaction above).

TABLE II.—ELEMENTARY ANALYSES

| | Formula | Calculated, percent | | | | | Found, percent | | | | |
|---|---|---|---|---|---|---|---|---|---|---|---|
| | | C | H | N | O | Mol. wt. | C | H | N | O | Mol. wt. |
| Example: | | | | | | | | | | | |
| 1 | C₁₂H₁₄N₂O | 71.26 | 6.98 | 13.85 | 7.91 | 202 | 70.87 | 6.91 | 13.75 | 8.09 | 255 |
| 2 | C₁₃H₁₆N₂O | 72.19 | 7.46 | 12.95 | 7.40 | 216 | 72.04 | 7.46 | 13.06 | 7.93 | |
| 3 | C₁₆H₂₂N₂O | 74.39 | 8.59 | 10.85 | 6.18 | 258 | 74.22 | 8.56 | 10.56 | 6.50 | 262 |
| 4 | C₁₉H₂₀N₂O | 78.05 | 6.90 | 9.58 | 5.47 | 292 | 77.77 | 6.89 | 9.73 | 6.07 | 269 |
| 5 | C₁₇H₂₃N₂O₃ | 67.52 | 7.33 | 9.27 | 15.88 | 302 | 67.30 | 7.35 | 9.45 | 15.98 | 317 |
| 6 | C₂₂H₂₄N₂O₂ | 72.5 | 6.64 | 7.69 | 13.17 | 364 | 72.39 | 6.82 | 7.34 | 13.46 | |

EXAMPLE 7–9

2-R²-3-hydroxy-4-phenyl-5-(N,N-dimethylamino)-2H-pyrroles

In these examples, 1-phenyl-2-bis(N,N-dimethylamino) ethylene was reacted with the methyl or (in Example 9) ethyl ester of a primary alpha-aminoacid in accordance with the overall reaction:

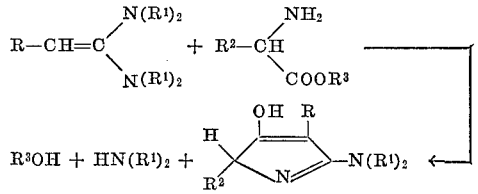

wherein R is phenyl, R¹ is methyl, R² is as indicated and R³ is methyl or ethyl. The general method for the preparation was as follows:

The hydrochloride of the alpha-aminoester (0.01 mole) is suspended in 10 milliliters of xylene and 0.013 mole of triethylamine is added. The mixture is agitated for 30 minutes at room temperature. The white crystalline precipitate (tri-ethylamine hydrochloride) is separated and the ketene-N,N-acetal (0.011 mole) as added to the solution which is then brought up to the boiling point. About 3 milliliters are distilled off, then the reflux is continued for 8 to 16 hours (see Table III below). The solution is then partly concentrated by distillation and the product is recovered by recrystallization as in Examples 1–6. Table III below displays R², reflux times, yield, and melting points of the 2H-pyrroles.

TABLE III

| R² | Reflux time, hrs. | Yield, percent | M.P., °C. |
|---|---|---|---|
| Example: | | | |
| 7 ........ CH₃(CH₂)₂ ........ | 8 | 57 | 180 |
| 8 ........ Benzyl ........ | 16 | 55 | 168 |
| 9 ........ C₂H₅OOC(CH₂)₂ ........ | 16 | 46 | 137 |

The IR, UV, and NMR spectra, and the elemental analyses were all in agreement with the assigned structures.

EXAMPLE 10

2,3-dihydro-3-oxo-4-phenyl-5-(N,N-dimethylamino)-1-methylpyrrole

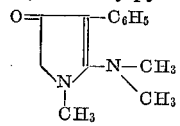

Ethyl sarcosinate (1.4 grams; 0.01 mole) was liberated from its HCl salt in ether as described in previous examples. Then 1.6 grams (0.011 mole) of 1-phenyl-2-(N,N-dimethylamino) acetylene was added to the mixture at room temperature. After 30 minutes the ynamine had disappeared. The triethylamine hydrochloride was separated and the ethereal solution was concentrated to dryness. The residue was distilled at 145°–155° C./0.1 torr giving a semisolid yellow compound. The NMR, UV, and IR spectra of the HCl salt were in agreement with the assigned structure. The melting point of the HCl salt was 153° C. (recrystallized from acetone-ether), and the elemental analysis of the HCl salt was as follows:

Calc'd. for C₁₃H₁₇N₂OCl (percent): C, 61.78; H, 6.78; N, 11.08; O, 6.33; Cl, 14.03. Found (percent): C, 61.04; H, 6.69; N, 10.91; O, 6.49; Cl, 13.69.

EXAMPLE 11

2-(N,N-dimethylamino)-3-phenyl-4-oxo-1,4-dihydro-quinoline

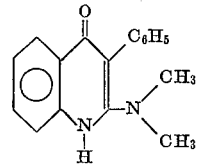

(a) A mixture of ethyl anthranilate (1.5 grams; 0.01 mole) and 1,1-bis(N,N-dimethylamino)-2-phenylethylene (1.9 grams; 0.01 mole) was warmed at 210° C. for 30 minutes without solvent. The mixture was cooled and crystallized from ethanol giving 1.1 grams of the product (43% yield).

(b) A mixture of 1-phenyl-2-(N,N-dimethylamino) acetylene (1.6 grams; 0.011 mole) and ethyl anthranilate (1.5 grams; 0.01 mole) was refluxed in anhydrous benzene and then two drops of boron trifluoride-etherate were added. Heating was continued until the ynamine disappeared (about 1.5 hours). Benzene was then evaporated and 3 milliliters of ethylene glycol was added. The resulting mixture was heated at reflux for 30 minutes. The solution was cooled and 10 milliliters of ethanol was added, giving a crystalline mass. The solid was filtered and crystallized from ethylene glycol-ethanol to yield 1.6 grams of the desired product having a melting point of 256° C. (61 percent yield.) The UV and IR spectra were consistent with the assigned structure.

Elemental analysis of the product was as follows:

Calc'd for C₁₇H₁₆N₂O (percent): C, 77.25; H, 6.11; N, 10.60; O, 6.06; M.W., 264.32. Found (percent): C, 77.56; H, 6.27; N, 10.60; O, 6.14; M.W., 280.7.

EXAMPLE 12

1-(N,N-dimethylamino)-2-phenyl-3-oxo-3,4,5,6,7,8-hexahydropirrocoline

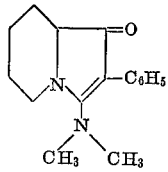

This compound was prepared by a procedure analogous to that described in Examples 1–6 from 1.8 grams (0.01 mole) of the hydrochloride of methyl piperidine-2-carboxylate and 1.6 grams (0.011 mole) of 1-phenyl-2-(N,N-dimethylamino)acetylene. When ether was distilled off, the oily residue crystallized spontaneously with heat evolving. The product was crystallized from ethanol to yield a product melting at 149°–153° C. (with decomposition) in 74 percent yield. UV and IR spectra were consistent with the assigned structure.

Elemental analysis was as follows:

Calc'd for $C_{16}H_{20}N_2O$ (percent): C, 74.96; H, 7.86; N, 10.93; O, 6.24; M.W., 286.94. Found (percent): C, 74.64; H, 7.88; N, 10.93; O, 6.63; M.W., 287.

EXAMPLE 13

2-(N,N-diethylamino)-3-methyl-4-oxo-1,4-dihydro-quinoline

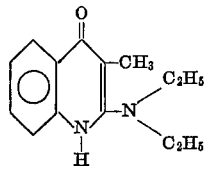

A mixture of 1-methyl-2-(N,N-diethylamino)acetylene (3.3 grams; 0.03 mole) and ethyl anthranilate (4.5 grams; 0.03 mole) was refluxed in 10 milliliters of toluene and 3 drops of boron trifluoride-etherate were added. Heating was continued for 20 hours. The toluene was distilled off and 5 milliliters of nitrobenzene were added to the residue. The mixture was heated for 20 minutes at 200° C. The solution was then cooled, diethyl ether was added to precipitate the product which was crystallized from ethanol. Yield was 46.5 percent of the product having a melting point of 290–291° C.

The UV and IR spectra were consistent with the assigned structure. The keto tautomer was found rather than the enol, as was also the case with Example 11.

Elemental analysis was as follows:

Calc'd for $C_{14}H_{18}N_2O$ (percent): C, 73.01; H, 7.88; N, 12.17; O, 6.97; M.W., 230.3. Found (percent): C, 73.19; H, 8.11; N, 12.15; O, 7.13; M.W., 231.

What is claimed is:
1. A compound of the formula:

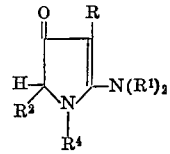

wherein R is $R^1$ of $-N(R^1)_2$ and wherein each $R^1$, $R^2$ or $R^4$, individually are members selected from the class consisting of alkyl, cycloalkyl, of up to 12 carbon atoms, phenyl, ethoxycarbonylethyl and benzyloxycarbonylethyl.

2. The compound of claim 1 which is 3-hydroxy-4-phenyl-5-(N,N-dimethylamino)-2H-pyrrole.

3. The compound of claim 1 which is 2-methyl-3-hydroxy-4-phenyl-5-(N,N-dimethylamino) - 2H - pyrrole.

4. The compound of claim 1 which is 2-propyl-3-hydroxy - 4 - phenyl-5-(N,N-dimethylamino)-2H-pyrrole.

5. The compound of claim 1 which is 2-isobutyl-3-hydroxy - 4 - phenyl-5-(N,N-dimethylamino)-2H-pyrrole.

6. The compound of claim 1 which is 2-benzyl-3-hydroxy - 4 - phenyl-5-(N,N-dimethylamino)-2H-pyrrole.

7. The compound of claim 1 which is 2-(2-ethoxycarbonylethyl) - 3 - hydroxy-4-phenyl-5-(N,N-dimethylamino)-2H-pyrrole.

8. The compound of claim 1 which is 2-(2-benzyloxycarbonylethyl) - 3 - hydroxy-4-phenyl-5-(N,N-dimethylamino)-2H-pyrrole.

9. The compound of claim 1 which is 2,3-dihydro-3-oxo-4-phenyl-5-(N,N - dimethylamino)-1-methyl-pyrrole.

References Cited

UNITED STATES PATENTS 3,205,233  9/1965  Clarkson _____ 260—288
3,210,358  10/1965  Pfister et al. _____ 260—288
3,285,913  11/1966  Easton et al. _____ 260—280X ALEX MAZEL, Primary Examiner J. A. NARCAVAGE, Assistant Examiner U.S. Cl. X.R.

260—283, 288, 294, 294.3, 294.7, 296, 471